(12) United States Patent
Maier

(10) Patent No.: US 6,514,452 B1
(45) Date of Patent: Feb. 4, 2003

(54) DOUBLE-MOLD BLOW-MOLDING SYSTEM AND METHOD OF USE

(75) Inventor: Rudolf Maier, Lohmar (DE)

(73) Assignee: Fischer-W. Muller Blasformtechnik GmbH, Troisdorf (DE)

( * ) Notice: Subject to any disclaimer, the term of this patent is extended or adjusted under 35 U.S.C. 154(b) by 356 days.

(21) Appl. No.: 09/594,939

(22) Filed: Jun. 15, 2000

(30) Foreign Application Priority Data

Jun. 15, 1999 (DE) .......................................... 199 27 138

(51) Int. Cl.$^7$ .......................... B29C 49/04; B29C 49/56
(52) U.S. Cl. ....................... 264/542; 425/532; 425/541; 425/450.1; 425/451; 425/451.9
(58) Field of Search ......................... 264/542; 425/532, 425/538, 541, 451, 451.7, 450.1, 451.9

(56) References Cited

U.S. PATENT DOCUMENTS

| | | | | |
|---|---|---|---|---|
| 5,145,353 A | * | 9/1992 | Zakich ..................... | 425/450.1 |
| 5,562,934 A | * | 10/1996 | Langos et al. ............ | 425/451.3 |
| 5,705,121 A | * | 1/1998 | Allred, Jr. .................. | 264/540 |
| 5,853,773 A | * | 12/1998 | Choi ........................... | 425/136 |
| 5,975,881 A | | 11/1999 | Langos ....................... | 425/541 |
| 6,089,852 A | * | 7/2000 | Lee et al. .................... | 425/338 |

FOREIGN PATENT DOCUMENTS

EP 0768165 A2 * 4/1997

* cited by examiner

*Primary Examiner*—Robert Davis
(74) *Attorney, Agent, or Firm*—Herbert Dubno; Andrew Wilford

(57) ABSTRACT

A molding system has a slide displaceable parallel to an axis through a relatively long stroke relative to a stationary overhead extruder head, a center support fixed on the slide, and a pair of end supports displaceable axially through relatively short strokes on the slide between inner and outer end positions. A pair of inner mold halves carried on the center support are directed axially oppositely therefrom toward the end supports. Respective outer mold halves carried on the end supports are axially engageable with the respective inner mold halves in the inner positions of the end supports. An end-support drive connected between the slide and the end supports moves the end supports between their end positions and a slide drive connected to the slide moves the slide axially relative to the head. Each of the end-support drives includes a respective motor mounted on the slide.

9 Claims, 1 Drawing Sheet

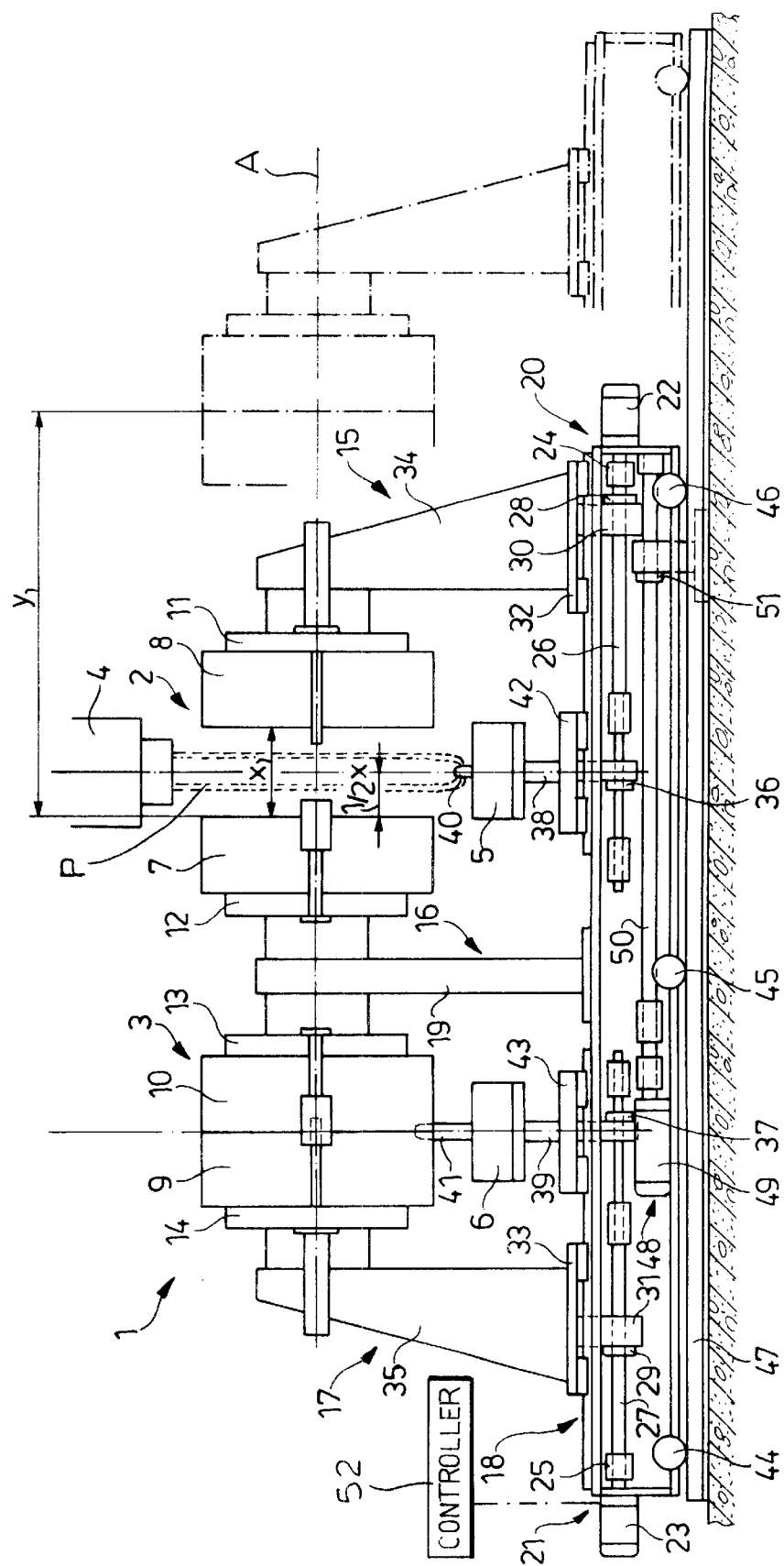

DOUBLE-MOLD BLOW-MOLDING SYSTEM AND METHOD OF USE

FIELD OF THE INVENTION

The present invention relates to a molding method and apparatus. More particularly this invention concerns a double-mold blow-molding system.

BACKGROUND OF THE INVENTION

In blow molding a hollow parison is ejected downward from an extruder head into a cavity formed between a pair of mold halves. The parison is a tube whose outer end engages over a blowing lance that is below the mold. The mold halves are closed on the parison, cutting it off from the extruder head and clamping it tight around the blowing lance. Then air is blown into the parison to expand it to fit tightly against the walls of the cavity, imparting the desired shape to it. After a short curing time due to the thinness of the workpiece walls the mold is opened and the cured workpiece ejected. Such techniques can be used for large and small workpieces and can produce shapes of considerable complexity.

In U.S. Pat. No. 5,975,881 of Langos a system is described therein the mold halves are not carried on an array of through-going tie rods, but instead are mounted on respective supports that ride on horizontal guides below a stationary extruder head. In a double system two outer mold halves are provided with respective drives for moving them horizontally on their guides, and the two respective inner halves are mounted on a common support that has no drive but that can slide on the guides and be locked at any position thereon. The inner mold halves are shifted by the outer halves between open and closed positions in a manner that is fairly complex and that does not adapt itself readily to different molding operations.

OBJECTS OF THE INVENTION

It is therefore an object of the present invention to provide an improved method of an apparatus for double-mold blow molding.

Another object is the provision of such an improved method of and apparatus for double-mold blow molding which overcomes the above-given disadvantages, that is which is simple and which allows the two molds to be opened and closed exactly as needed for a given product.

SUMMARY OF THE INVENTION

A molding system has according to the invention a main slide displaceable parallel to an axis through a relatively long stroke relative to a stationary overhead extruder head, a center support fixed on the main slide, and a pair of end supports displaceable axially through relatively short strokes on the slide between inner and outer end positions. A pair of inner mold halves carried on the center support are directed axially oppositely therefrom toward the end supports. Respective outer mold halves carried on the end supports are axially engageable with the respective inner mold halves in the inner positions of the end supports. An end-support drive connected between the slide and the end supports moves the end supports between their end positions and a slide drive connected to the slide moves the slide axially relative to the head.

With this system the supports, which each normally include a mounting plate to which the inner and outer mold halves are bolted, can therefore be moved to accommodate molds of different sizes. The structure is fairly simple in that the center support is fixed on the slide and it is actually the slide that is moved to position the inner mold halves. Movement of the slide therefore serves initially to move the inner mold half in on a mold being closed and subsequently to move the filled mold off into a curing/unloading station while the other mold is being loaded.

According to the invention each of the end-support drives includes a respective motor mounted on the slide and having a spindle extending parallel to the axis and formed with a threaded portion. A respective nut fixed to the respective end support is threaded on the threaded portion of the respective output spindle. Such a drive is extremely accurate and, when the motor is a stepping motor, makes it very easy for a computer controller to position the mold halves with great accuracy.

According to another feature of the invention a pair of respective blow-molding units are displaceable axially on the support. Respective blowing-unit drives connected between the units and the support displace the blowing units axially synchronously with the respective end supports. This allows the blow-molding units, which typically include a blowing lance or mandrel, to remain centered underneath the extruder head while the respective mold halves are closed on the parison whose upper end is still engaged by the head and whose lower end is fitted over the lance of the blowing unit. When the mold closes the parison is pinched off the extruder head and clamped tightly around the blowing lance.

The blowing-unit drives each include another threaded portion on the respective spindle and a respective nut threaded to the respective other threaded portion and fixed on the respective unit. The portion of each spindle engaging the end-support nut has a pitch (e.g. threads/inch) which is substantially equal to half a pitch of the spindle portion engaging the respective unit nut so that the end supports will move at twice the speed as the respective drive units, thereby covering twice the distance in the same time. This ensures perfectly synchronous movement of each outer mold half and the respective blowing unit. Of course as the blowing unit is moving outward at half speed, the slide is moving in at half speed to keep the blowing unit perfectly centered under the extruder head.

To prevent the end supports from canting on the slide, the slide has an upper surface provided with tracks on which the end supports are movable axially.

The method of the invention therefore comprises the steps of first opening one of the molds by displacing the slide in one direction through a. predetermined distance and the respective outer mold half oppositely through twice the predetermined distance with the respective inner mold half moving jointly with the slide to a position with the respective mold halves spaced apart underneath the extruder head. Then a parison is extruded from the head down between the halves of the one mold and the one mold is closed on the parison. Finally the slide is displaced to position the other of the molds underneath the head, the first three steps are repeated with the other mold.

BRIEF DESCRIPTION OF THE DRAWING

The above and other objects, features, and advantages will become more readily apparent from the following description, reference being made to the accompanying drawing whose sole Figure is a partly diagrammatic side view of a molding system in accordance with the invention.

SPECIFIC DESCRIPTION

As seen in the drawing an double blow-molding system has a mold assembly 1 has two molds 2 and 3 that coact with a downwardly open and stationary injector head 4 from which a hollow parison P is extruded. The molds 2 and 3 are associated with respective blowing units 5 and 6 intended to inject air into the parison P as is well known in the blow-molding art. The mold 2 has an inner part 7 and an outer part 8 displaceable toward and away from each other along a horizontal axis A and the mold 3 has mold halves 9 and 10 that are similarly displaceable. The mold halves 7, 8, 9, and 10 are removably mounted on respective upright support plates 11, 12, 13, and 14. The plate 15 is carried on an end mount 15, the plates 12 and 13 on a common center mount 16, and the plate 14 on an opposite end mount 17.

The two end mounts 15 and 17 are displaceable parallel to the axis A on a slide 18 by respective drives 20 and 21, but the mount 16 is formed as a post 19 fixed at the center of the slide 18 which itself is displaceable horizontally parallel to the axis A. The drive 20 comprises an electric motor 22 having a threaded spindle 26 supported on the slide 18 in a bearing 24 and threaded into a nut 28 carried on an outrigger 30 of a slide 32 carrying a stanchion 34 constituting the mount 15. Similarly the drive 21 comprises an electric motor 23 having a threaded spindle 27 carried on the slide 18 in a bearing 25 and threaded into a nut 29 carried on an outrigger 31 of a slide 33 carrying a stanchion 35 constituting the mount 16.

The two blowing units 5 and 6 have air-injecting mandrels 40 and 41 and are carried on respective posts 38 and 39 fixed to respective slides 42 and 43 provided with nuts 36 and 37 that are engaged by threaded end sections of the respective spindles 26 and 27. The spindle portions engaging the nuts 37 and 37 have a pitch half as steep as that of the portions engaging the nuts 28 and 29 and are of the same hand so that rotation of the spindles 26 and 27 will move the respective mounts 15 and 17 through axial distances that are twice what the units 5 and 6 will be moved through.

The slide 18 is supported by rollers 44, 45, and 46 on a guide track 47 fixed on the ground and extending parallel to the axis A. A drive 48 for the slide 18 comprises a motor 49 mounted on the slide 18 and having a threaded shaft 50 engaging in a nut 51 fixed relative to the ground so that rotation of this spindle 50 will displace the entire slide 18 and the molds 2 and 3 carried on it parallel to the axis A. A common computer-type controller 52 is connected to the drives 20, 21, and 48 to operate them synchronously with one another and with an unillustrated extruder having the head 4 and an unillustrated air supply connected to the mandrels 40 and 41.

In use the system is first set in the position shown in solid lines in the drawing so that the extruder head 4 is aligned between the mold halves 7 and 8 that are separated by a spacing x. Once the head 4 has extruded a hollow parison P whose lower end fits over the pin 40, the slide 18 is moved by its drive 50 through a distance equal to 0.5x outward, that is toward the right in the drawing, while the drive 20 synchronously moves the mold half 8 inward through the distance x and the unit 5 through the distance 0.5x, closing the mold 2 on the parison P, and maintaining the injector tube 40 directly aligned underneath the head 4.

Then the drive 50 displaces the entire slide 18 axially through the distance y and the cycle is repeated for the other mold 3. As the mold 3 is being filled and closed, the workpiece in the mold 2 is curing, so that the drive 22 can be operated to open this mold 2 and the finished workpiece can be stripped out of it.

I claim:

1. In combination with an extruder head, a molding system comprising:

a main slide displaceable through a relatively long stroke parallel to an axis relative to the extruder head;

a center support fixed on the main slide;

a pair of end supports displaceable axially through relatively short strokes on the slide between inner and outer end positions;

a pair of inner mold halves carried on the center support and directed oppositely therefrom axially toward the end supports;

respective outer mold halves carried on the end supports and engageable with the respective inner mold halves in the inner positions;

respective end-support drive means connected between the slide and the end supports for moving the end supports between their end positions; and slide drive means connected to the slide for moving the slide axially relative to the head.

2. The molding system defined in claim 1 wherein each of the end-support drive means includes a respective motor mounted on the slide and having a spindle extending axially and formed with a threaded portion, and a respective nut fixed to the respective end support and threaded on the threaded portion of the respective output spindle.

3. The molding system defined in claim 2, further comprising:

a pair of respective blow-molding units displaceable axially on the support; and respective blowing-unit drive means connected between the units and the support for displacing the units axially synchronously with the respective end supports.

4. The molding system defined in claim 3 wherein the blowing-unit drive means each include another threaded portion on the respective spindle, and a respective nut threaded to the respective other threaded portion and fixed on the respective unit.

5. The molding system defined in claim 4 wherein the portion of each spindle engaging the end-support nut has a pitch which is substantially equal to twice a pitch of the spindle portion engaging the respective unit nut.

6. The molding system defined in claim 1 wherein the slide has an upper surface provided with tracks on which the end supports are movable axially.

7. A method of molding with a system having a slide displaceable parallel to an axis through a long stroke relative to a stationary overhead extruder head;

a center support on the slide;

a pair of end supports displaceable axially through relatively short strokes on the slide between inner and outer end positions;

a pair of inner mold halves carried on the center support and directed oppositely therefrom axially toward the end supports;

respective outer mold halves carried on the end supports and engageable with the respective inner mold halves in the inner positions, the method comprising the steps of sequentially:

a) opening one of the molds by displacing the slide in one direction through a predetermined distance and the respective outer mold half oppositely through twice the predetermined distance with the respective inner mold half moving jointly with the slide to a position with the respective mold halves spaced apart underneath the extruder head;

b) extruding a parison from the head down between the halves of the one mold;
c) closing the one mold on the parison;
d) displacing the slide to position the other of the molds underneath the head; and
e) repeating steps a), b), and c) with the other mold.

8. The molding method defined in claim 7 wherein the system further has a pair of respective blow-molding units displaceable axially on the support, and respective blowing-unit drive means connected between the units and the support for displacing the supports axially synchronously with the respective end supports, the method further comprising the step during step a) of displacing the respective blow-molding unit oppositely to the respective inner mold half so as to maintain the respective blow-molding unit underneath the extruder head.

9. The molding method defined in claim 8 wherein the inner mold halves and units are moved at a speed equal to about half a speed of the respective outer mold halves.

* * * * *